United States Patent [19]

Mao et al.

[11] 4,166,155
[45] Aug. 28, 1979

[54] MAINTENANCE-FREE BATTERY

[75] Inventors: George W. Mao, St. Paul; Purushothama Rao, Burnsville; James F. Trenter, St. Paul, all of Minn.

[73] Assignee: Gould Inc., Rolling Meadows, Ill.

[21] Appl. No.: 921,653

[22] Filed: Jul. 3, 1978

Related U.S. Application Data

[63] Continuation of Ser. No. 742,611, Nov. 17, 1976, abandoned, which is a continuation of Ser. No. 514,019, Oct. 11, 1974, abandoned.

[51] Int. Cl.$^2$ .................................. H01M 10/06
[52] U.S. Cl. .................................. 429/82; 429/225; 429/245; 75/166 R; 75/166 D
[58] Field of Search ............... 429/82, 190, 225, 226, 429/228, 245; 15/166 B, 166 C, 166 R, 166 D

[56] References Cited

U.S. PATENT DOCUMENTS

| | | | |
|---|---|---|---|
| 2,159,124 | 5/1939 | Bettertou et al. | 75/167 |
| 3,177,096 | 4/1965 | Jache | 429/190 X |

FOREIGN PATENT DOCUMENTS 65713 10/1972 Luxembourg.
209749 1/1924 United Kingdom.

OTHER PUBLICATIONS

Vinal, Storage Batteries, 3rd Edition, John Wiley and Sons, Inc., 1940, p. 19.

*Primary Examiner*—Anthony Skapars
*Attorney, Agent, or Firm*—Leydig, Voit, Osann, Mayer & Holt, Ltd.

[57] ABSTRACT

The present invention provides a maintenance-free battery having improved performance characteristics and utilizing a unique, hybrid combination of ternary alloys for the positive and negative grids. The positive grids are formed from a ternary, lead base alloy consisting essentially of lead, from about 1.0 to about 2.0% antimony and from about 1.2 to about 2.2% cadmium, the cadmium being present in an amount at least equal to the amount of antimony present; and the negative grids are formed from a ternary lead base alloy consisting essentially of lead, from 0.06 to about 0.20% calcium and from about 0.10 to about 0.40% tin, the percentages of each alloy being based on the alloy weight.

4 Claims, 2 Drawing Figures

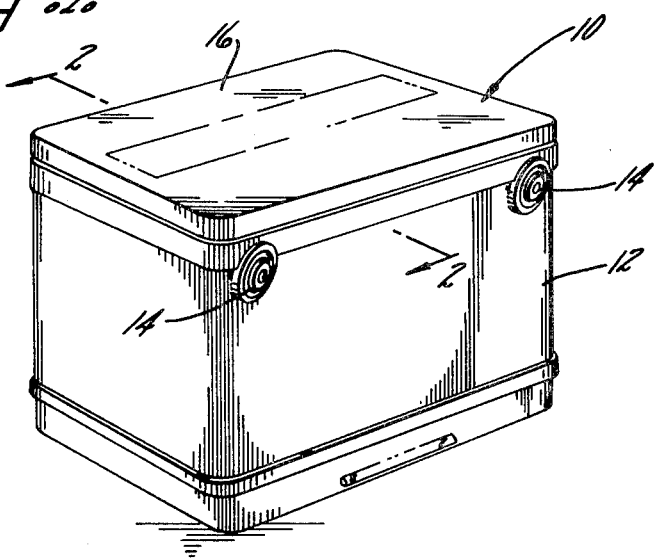
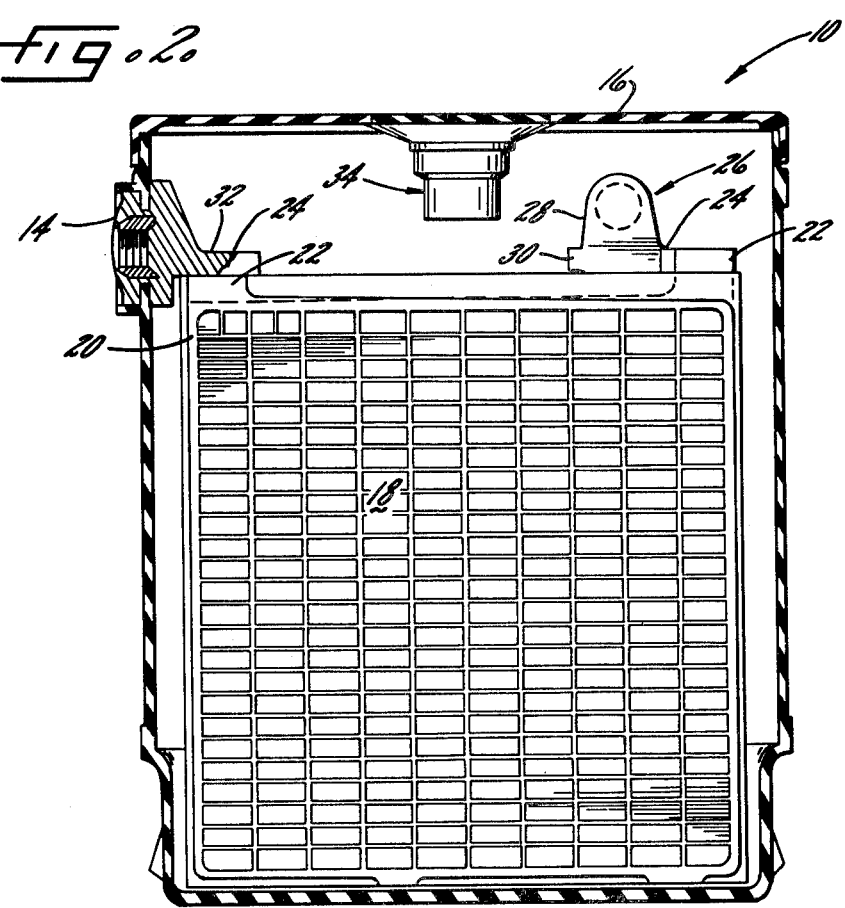

MAINTENANCE-FREE BATTERY

This is a continuation, of application Ser. No. 742,611, filed Nov. 17, 1976, now abandoned which in turn is a continuation of Ser. No. 514,019 filed Oct. 11, 1974, now abandoned.

RELATED APPLICATIONS

Miller, Ser. No. 222,611, filed Feb. 1, 1972, now U.S. Pat. No. 3,802,597, for: "Cover Design for Maintenance-Free Battery".

Mao and Rao, Ser. No. 403,179, filed Oct. 3, 1973, now abandoned, for: "Lead Base Calcium-Tin Alloy and Use Thereof for Lead-Acid Battery Grid Fabrication".

Rao and Mao, Ser. No. 403,178, filed Oct. 3, 1973, now abandoned, for: "Lead Base Cadmium Tin Alloy Useful for Forming Battery Components".

Mao and Lannoye, Ser. No. 421,867, filed Dec. 5, 1973, now abandoned, for: "Cadmium-Antimony-Lead-Alloy for Maintenance-free Lead-Acid Battery".

Mao, Ser. No. 514,023, filed on even date herewith, for: "Maintenance-Free Battery and Method for Reducing the Current Draw of Such Batteries".

This invention relates to lead-acid storage batteries, and more particularly, to maintenance-free batteries having improved performance characteristics.

Lead base alloys have been used for storage battery plate grids for many years. The electrochemical characteristics of lead as well as its low cost make it suitable as a primary material, but alloying ingredients must be included because of the inherent physical weakness of the lead. A large number of different alloying materials in various percentages and combinations have been considered. Antimony-lead alloys containing anywhere from about 4.5 to 12% by weight antimony have been used for the preparation of the grid in lead acid batteries. The principal function of the antimony constituent is to impart adequate grid strength as well as permitting easy casting of the grid. Lithium and combinations of lithium and tin have likewise been employed as is shown in U.S. Pat. No. 3,647,545. Still further, Canadian Pat. No. 920,393 describes a lead base alloy containing cadmium and antimony for use in forming battery grids. As shown in that patent, alloying about 2.5 to 3% cadmium with 2.5% antimony in a lead alloy imparts a tensile strength considerably above the which would ordinarily be expected.

Recently, much interest has been placed upon providing automotive type, wet cell, lead-storage batteries in configurations which can be readily installed and which require, once in service, no further maintenance throughout the expected life of the battery. One aspect of this effort to provide such maintenance-free batteries is to utilize internal components that make it unnecessary to inspect and replenish electrolyte levels in the cells over the normal battery life.

To achieve this maintenance-free objective, substantial elimination of water losses must be achieved. This requires that the grids employed in the maintenance-free battery draw only a small current during constant voltage over-charge so that only minimum gas generation occurs with the accompanying water loss being concomitantly minimized. With conventional automotive batteries using antimony-lead grids typically containing about 4.5% by weight antimony, the current draw at the completion of charging is unacceptably high for maintenance-free battery applications. In addition, it is known that self-discharge of a wet, lead-acid battery employing an antimony alloy is caused primarily by the dissolution of antimony from the grids and its subsequent deposition on the negative plates, where it causes electrochemical reactions that discharge the lead to lead sulfate. For these reasons, the development of suitable materials for grids for use in maintenance-free batteries has primarily emphasized the use of lead base alloys not containing antimony.

The copending Mao and Rao application, identified herein, presents one type of alloy suitable for forming the grids of maintenance-free batteries. Thus, a lead base alloy containing, by weight, 0.06 to 0.10% calcium and 0.10–0.40% tin in disclosed. A further approach is described in the previously identified Rao and Mao application. This discloses a cadmium-tin-lead alloy which is useful in forming components of the battery elements, including the battery grid in a maintenance-free battery.

A still further approach is described in the herein identified Mao and Lannoye application in which a lead base alloy containing, typically, from about 1.0 to 2.0% antimony and from about 1.2 to about 2.2% cadmium is disclosed. Lead-acid battery grids can be easily cast from such alloy, and the grids may be advantageously employed in the preparation of maintenance-free batteries to provide superior characteristics.

U.S. Pat. No. 3,287,165 to Jensen discloses the use of positive grids composed of a lead antimony binary alloy and negative grids formed of a lead calcium binary alloy. The elimination of antimony from the negative grids is said to maximize the hydrogen over voltage with a concomitant reduction of water loss.

Certain of the above-described alloys do provide suitable materials for forming battery grids for use in maintenance-free battery applications. However, there is still significant room for improvement to produce a maintenance-free battery having improved performance characteristics. Thus, for example, it would be highly desirable for motive power applications such as electric vehicles to provide a maintenance-free battery capable of enduring repeated deep discharge cycles without any significant loss from the capacity obtained in the initial cycles.

It is accordingly an object of the present invention to provide a maintenance-free battery having overall, improved performance characteristics.

Another object provides a maintenance-free battery having superior cold performance characteristics.

A still further object is to provide a maintenance-free battery having the ability to sustain the battery capacity after repeated deep discharges.

Yet another object lies in the provision of a maintenance-free battery possessing decreased open circuit stand loss characteristics.

A further object of this invention is to provide a maintenance-free battery requiring a decreased charging current for a particular charging voltage after the battery has been fully charged.

Other objects and advantages of the present invention will be apparent as the following description proceeds, taken in conjunction with the accompanying drawings in which:

FIG. 1 is a perspective view of a maintenance-free battery;

FIG. 2 is a cross sectional view, taken generally along lines 2—2 of FIG. 1 and illustrating a battery grid in accordance with the present invention.

While the invention is susceptible of various modifications and alternative forms, specific embodiments thereof have been shown by way of example in the drawings and will hereinafter be described in detail. It should be understood, however, that it is not intended to limit the invention to the particular forms disclosed, but, on the contrary, the intention is to cover all modifications, equivalents and alternatives falling within the spirit and scope of the invention as expressed in the appended claims.

In brief, the present invention is predicated on the discovery that a maintenance-free battery, having overall improved performance characteristics, is provided when a specific combination of ternary alloys is utilized to form the positive and negative grids. To this end, a maintenance-free battery is provided in which the positive grids are formed from a specific lead-antimony-cadmium alloy and the negative grids are formed from a lead base alloy including specific calcium and tin levels.

With respect to the alloy utilized to form the positive grids, it is difficult to separate the benefits derived from the various constituents. However, it appears that the level of antimony employed provides a battery having adequate cycle life as well as adequately low level of water consumption. Such an alloy also has superior castability characteristics and exhibits a relatively uniform corrosion behavior. It has been found suitable to maintain the antimony content, based upon the total weight of the alloy, in the range of from about 1 to about 2.0%, preferably from about 1.0 to about 1.5%.

The cadmium content in the alloy of the present invention used for the positive grids should be sufficiently high so as to eliminate any significant cracking of the grids as well as providing satisfactory mechanical strength. The grid casting of low antimony lead alloys in the absence of other elements is difficult and impractical because of its "cracking" phenomenon. The addition of cadmium appears to eliminate this difficulty. To insure that the overall characteristics are achieved, the cadmium should be present in an amount at least equal to the antimony content in the alloy. It is preferred to have the cadmium present in a slight excess, and it has been found desirable to maintain the cadmium content from about 10 to 20% greater than the antimony content. Based upon the total weight of the alloy, it has been found acceptable to maintain the cadmium content in the range of from about 1.2 to about 2.2%, preferably 1.2 to 1.8%.

In accordance with a further aspect of the present invention, the negative grids for the electrodes are formed from a lead base alloy containing minor amounts of calcium and tin. The use of an alloy of this type provides a maintenance-free battery with low water consumption characteristics and increased conductivity. The calcium can be present in an amount from about 0.06 to 0.20% by weight of the total alloy. For use with negative grids of relatively small thicknesses (e.g.—less than about 0.055 inches), it is preferred to utilize a calcium content in the range of 0.11 to 0.15% by weight to enhance the handleability during the casting operation due to the increased instantaneous stiffness. The amount of tin which is added should be in the range of from about 0.1 to about 0.4% by weight, based upon the total weight of the alloy, and preferably from 0.2 to 0.3% by weight.

The ternary alloys used for the positive and negative grids in accordance with the present invention can contain negligible amounts of impurities such as are typically found in commercially available battery grade lead. While impurities may be contained in the other alloying constituents which are used, the relatively smaller amounts of these constituents make the typical impurities less important than those contained in the grade of lead employed. Although ternary alloys are contemplated herein, it should be appreciated that the alloys of the present invention can include other ingredients so long as they do not significantly adversely affect the desirable features attributable to the present invention.

The alloys described herein may be produced in the conventional manner by adding the alloying constituents in the prescribed amounts to the molten lead and then mixing until the mass is homogeneous. Production of the grids using the alloy can then be accomplished by commercially used high speed grid manufacturing techniques. Casting temperatures of from about 750° F. to about 850° F. into appropriate molds maintained at a temperature of about 350° to 450° F. have been found to be satisfactory.

Turning now to the drawings, FIGS. 1 and 2 show a maintenance-free battery utilizing the unique alloy combination of this invention for the positive and negative grids. Thus, a maintenance-free battery 10 is shown which includes a container 12, a pair of terminal posts 14 and a cover 16 sealed to the container by any conventional means. The container is divided into a plurality of cells, a portion of one cell being shown in FIG. 2; and a battery element is disposed in each of the cells. The battery element comprises a plurality of electrodes, one of the positive grids being shown generally at 18. The negative grids are of identical construction but are formed with the calcium-tin-lead alloy as has been described herein. The electrode illustrated includes a supporting grid structure 20 having integral lug 22, a layer of active material attached thereto and a strap 24 joining the lugs 22 of the respective positive and negative grid structures together.

Intercell connectors are shown generally at 26 and include a lug 28 and a base 30, the base 30 forming a part of the strap 24 after assembly of the components into a battery element, as by welding. The terminal posts 14 are similarly electrically connected through separate straps 24 to the supporting grid structure 30 during assembly, the base 32 of the terminal posts forming a part of the strap 24. Suitable venting means for allowing evolved gases to escape are shown at 34. A more detailed description of the venting means is set forth in the herein identified copending Miller application. The battery components such as the intercell connectors, straps and terminal posts are desirably formed from the cadmium-tin-lead alloy described in the copending Rao and Mao application identified herein.

The following examples are intended to be merely illustrative of the present invention and not in limitation thereof. Unless otherwise indicated, all parts and percentages are by weight.

EXAMPLE 1

Group 24 batteries (70 Ampere Hour capacity) having the following alloy compositions were subjected to gassing current and electrical performance tests:

| Battery Number | Alloy Composition, % | |
|---|---|---|
| | Positive grids | Negative grids |
| 1 and 2 | Cd-1.5<br>Sb-1.2<br>Pb-Remainder | Ca-0.12<br>Sn-0.30<br>Pb-Remainder |
| 3 and 4 | Both positive and negative<br>include: Cd-1.5, Sb-1.2<br>and the remainder lead | |

Battery numbers 1 and 2 employ the unique positive and negative grid structures according to this invention.

The results are shown in Table I:

TABLE 1

A. Gassing Current

| | Immediately After Formation | | After One Reserve, Two 0° F. and One 25 Amp Discharge | | |
|---|---|---|---|---|---|
| Battery<br>Number | 14.40V<br>(107°–108° F.) | 14.10V<br>(107°–108° F.) | 14.40V<br>(107°–108° F.) | 14.10V<br>(107°–108° F.) | 14.10V - 125° F. |
| 1 | 190 mA | 140 mA | 122 mA | 87 mA | 130 mA |
| 2 | 192 mA | 140 mA | 128 mA | 85 mA | 110 mA |
| 3 | 680 mA | 430 mA | 310 mA | 168 mA | 310 mA |
| 4 | 625 mA | 364 mA | 260 mA | 153 mA | 290 mA |

B. Electrical Performance

| Battery<br>Number | First Reserve Capacity<br>Minutes | First 0° F. Performance | | | Second 0° F. Performance | | | RC<br>Minutes |
|---|---|---|---|---|---|---|---|---|
| | | Rate | 5 Sec.V. | 30 Sec.V. | Rate | 5 Sec.V. | 30 Sec.V. | |
| 1 | 133 | 440V | 7.57 | 7.43 | 460A | 7.41 | 7.24 | 128 |
| 2 | 127 | 460A | 7.40 | 7.26 | 460A | 7.40 | 7.20 | 129 |
| 3 | 115 | 410A | 7.72 | 7.59 | 430A | 7.50 | 7.36 | 127 |
| 4 | 128 | 430A | 7.32 | 7.22 | 430A | 7.44 | 7.26 | 125 |

EXAMPLE 2

The performance characteristics of maintenance-free batteries (81 Ampere Hour capacity) according to the present invention (having the same alloy composition for the positive and negative grids as in battery numbers 1 and 2 of the prior Example) were compared with a maintenance-free battery of the same capacity having both positive and negative grids formed from the calcium-tin-lead alloy composition used for the negative grids of battery numbers 1 and 2 of the previous Example. Battery numbers 5–10 employ an electrode configuration in accordance with the present invention, and battery number 11 has grids formed from the calcium-tin-lead alloy.

The results are shown in Table 2:

TABLE 2

| Battery Number | 25 Amp Discharge<br>Capacity in Minutes | | 0° F. Cold Performance<br>550 Amp Discharge | | Gassing Current<br>14.10V (125° F.) |
|---|---|---|---|---|---|
| | First | Second | 5 Sec.V. | 30 Sec.V. | |
| 5 | 150 | 145 | 7.62 | 7.55 | 160 mA |
| 6 | 150 | 145 | 7.58 | 7.50 | |
| 7 | 149 | 146 | 7.68 | 7.58 | |
| 8 | 152 | 148 | 7.53 | 7.44 | |
| 9 | 144 | 137 | 7.52 | 7.42 | |
| 10 | 150 | 147 | 7.61 | 7.53 | |
| 11 | 144 | — | 7.68 | 7.50 | 140 mA |

As can be seen from Example 1, the gassing current in maintenance-free batteries having the unique hybrid grid alloy combination according to the present invention is much lower than that of the batteries using the cadmium-antimony-lead alloys for both the positive and negative grids. The cold cranking current at 0° F. for such hybrid batteries is also about 25 to 35 Amps. higher than the comparative batteries tested.

From Example 2, it is illustrated that the hybrid batteries of this invention provide maintenance-free batteries with slightly higher reserve capacity than for maintenance-free batteries having calcium-tin-lead grids. Such hybrid batteries will also retain higher capacities during repeated deep discharge-charge type cycling. Still further, the cold cranking capacity is generally the same as the comparative batteries, and the gassing current is almost the same.

Thus, as has been seen, the present invention provides a maintenance-free battery having, overall, improved performance characteristics due to the unique hybrid combination of alloys employed for the alloys used to form the positive and negative grids. The open circuit stand loss is decreased in view of the raising of the hydrogen over voltage in the negative grids. Further, the charging current required for any given charging voltage once the batteries are fully charged is significantly lowered. The maintenance-free batteries also exhibit superior cold performance as well as the ability to sustain capacities during repeated, deep discharge-charge type cycling. Still further, it is believed that the presence of the cadmium in the alloy used to form the positive grids and the relative absence of antimony in the battery, particularly in the negative grids, significantly reduces the gassing current characteristics of maintenance-free batteries in accordance with the present invention. More specifically, it is hypothesized that a portion of the cadmium preferentially migrates to the negative grids and deposits thereon, thereby increasing the electronegativity so that the current draw and thus the water consumption will be reduced.

We claim:

1. In a maintenance-free lead-acid battery comprising a battery container having a plurality of cells, a cover sealed to the container, venting means providing passages for the escape of evolved gas and an electrolyte contained in the cells, each cell having components including a plurality of positive and negative electrodes disposed therein comprising a grid supporting structure having a layer of active material attached thereto, the improvement wherein the grid supporting structure of the positive electrodes are formed from a ternary lead base alloy consisting essentially of lead, from about 1.0 to about 2.0% antimony and from about 1.2 to about 2.2% cadmium, the cadmium being present in an amount at least equal to the amount of antimony present, and the grid supporting structure of the negative electrodes are formed from a ternary lead base alloy consisting essentially of lead, from about 0.06 to about 0.20% calcium and from about 0.10 to about 0.40% tin, the percentages of each alloy being based on the alloy weight.

2. The maintenance-free battery of claim 1 wherein the cadmium in the alloy for the positive electrodes is present in a slight excess.

3. The maintenance-free battery of claim 2 wherein the cadmium is present in an amount of from about 1.2 to about 1.8% and the antimony is present in an amount of from about 1.0 to about 1.5%.

4. The maintenance-free battery of claim 2 wherein the alloy for negative electrodes includes calcium in an amount of from about 0.11 to 0.15% and tin in an amount of from about 0.20 to 0.30%.

* * * * *